United States Patent

Miller et al.

[11] Patent Number: 5,977,957
[45] Date of Patent: Nov. 2, 1999

[54] ADAPTIVE SAMPLING OF TOUCH SCREEN INPUT

[75] Inventors: Brian David Miller, Durham; Joseph Norman Morris, Chapel Hill; Billy Gayle Moon, Apex, all of N.C.

[73] Assignee: Ericsson Inc., Research Triangle Park, N.C.

[21] Appl. No.: 08/861,799

[22] Filed: May 22, 1997

[51] Int. Cl.⁶ ............................ G09G 5/00; G08C 21/00
[52] U.S. Cl. ................... 345/174; 178/18.01; 178/18.03; 178/20.01; 178/20.03
[58] Field of Search ..................................... 345/173, 174, 345/210, 211, 212; 178/18.01, 18.03, 20.01, 20.03

[56] References Cited

U.S. PATENT DOCUMENTS

| 5,326,940 | 7/1994 | Doubrava et al. | 178/18 |
| 5,428,192 | 6/1995 | Chen et al. | 178/20.03 |
| 5,497,176 | 3/1996 | Sasaki | 345/173 |
| 5,638,093 | 6/1997 | Takahashi et al. | 345/173 |
| 5,777,604 | 7/1998 | Okajima et al. | 178/20.03 |
| 5,796,389 | 8/1998 | Bertram et al. | 345/173 |

FOREIGN PATENT DOCUMENTS

| 0 706 112 | 4/1996 | European Pat. Off. . |
| 5-324179 | 12/1993 | Japan . |
| 2 292 507 | 2/1996 | United Kingdom . |

*Primary Examiner*—Vijay Shankar
*Attorney, Agent, or Firm*—Robert A. Samra

[57] ABSTRACT

A touch screen input device includes a display screen adapted for receiving a touch input from a user; mechanism for sampling the touch screen input at any one of a plurality of sampling rates; mechanism for storing a predetermined sampling rate for each application or for each function; and mechanism for setting the sampling rate of the sampling mechanism to the sampling rate stored for a given application or a given function whenever that given application is being executed or that given function is being performed, respectively. In an alternative embodiment, the rate of change of the touch screen input sample points is measured and the sampling rate increased or decreased when the rate of change of the sample points increases or decreases, respectively.

30 Claims, 2 Drawing Sheets

ADAPTIVE SAMPLING OF TOUCH SCREEN INPUT

BACKGROUND OF THE INVENTION

1. Technical Field

The present invention relates to devices which can receive user input through a display screen and, more specifically, to a method and a system for controlling the rate of sampling of such user input so as to reduce power consumption and improve processing efficiency in such devices.

2. Related Prior Art

Portable computers are used today in a variety of applications and environments. Many users prefer the convenience of a "laptop" or "hand-held" portable computer to a "desktop" computer or workstation. Some portable computers are general purpose computers which are designed to support the traditional home or office environment, while others may be specifically designed for a particular application, such as tracking production volumes in a factory or inventory levels in a warehouse. As with computers in general, the capabilities (i.e., built-in memory and processing power and speed) of portable computers continue to increase with the passage of time and, as a result, it is likely that the use of portable computers will become even more widespread in the foreseeable future.

Many types or brands of commercially available portable computers allow the user to enter data by interacting with the display screen in a manner generally referred to as "touch screen input." Examples of portable computers that use touch screen input include the so-called "personal digital assistant" (PDA) devices such as the Apple Newton, Motorola Envoy and U.S. Robotics Pilot products. The form and content of touch screen input may vary depending on the choice of software or hardware. For example, in some applications the user may be prompted to select a particular action or menu command by pressing or placing his finger against a corresponding "radio button" that appears on the screen. In other applications, the user may be able to use an input "pen" to write or draw on the screen. In all of these applications, a sampling circuit is used to detect sample and translate the touch screen input into digital signals for appropriate processing by the computer.

In general, the touch screen input sampling circuit is designed to detect and periodically sample the points at which the user's finger or pen impacts the screen and to convert each sample point into a digital value which is delivered to the microprocessor for appropriate processing. The sample points may be detected through a variety of known techniques corresponding to the different types of currently available touch screen technologies (e.g., resistive, capacitive, force vector, guided acoustic wave, surface acoustic wave, scanning infrared or strain gauge). For example, in many conventional sampling circuits the sample points are detected by pressure sensors connected to the display screen. More recently, electromagnetic sensors have been used for this purpose. Regardless of the detection method and depending on the particular application, the microprocessor may store the input values (data) for subsequent processing (e.g., when the user is entering a drawing) or immediately execute one or more functions corresponding to these values (e.g., where the user has pushed a button representing a certain command).

It is well known in the art that in order to improve the quality or reliability of the touch screen input data, the sampling rate (sampling frequency) must be increased in the sampling circuit. However, it is also recognized that a faster sampling rate leads to greater power consumption in the sampling circuit and to lower overall performance for the microprocessor as more processing cycles are devoted to handling touch screen input data as opposed to other required or desirable tasks. Thus, in some prior art portable computers a high sampling rate was used at the expense of higher power consumption and lower processor performance, while in other prior art computers, a low sampling rate was used at the expense of lower quality or insufficient data. In still other cases, a combination of both approaches was used in which the computer initially would be placed in a "sleep mode" (low sampling rate and low power consumption) and then switched to "active mode" (high sampling rate and high power consumption) once a touch screen input was detected. However, this combined approach fails to solve the problem of minimizing power consumption during active mode.

As portable computers frequently run on battery power and as battery life is limited by power consumption, it is desirable that the power consumption of the touch screen input sampling circuit be reduced to the extent possible. However, it is also desirable that the touch screen input data be as reliable as possible, which may require a higher sampling rate resulting in higher power consumption as well as lower processor performance. A primary object of the present invention is to dynamically achieve the desired tradeoff between a higher sampling rate, on the one hand, and higher power consumption and lower processor performance, on the other hand.

SUMMARY OF THE INVENTION

The present invention departs from the prior art approach of maintaining a single (high or low) sampling rate for all applications which use touch screen input. instead, the present invention recognizes that the sampling rate should be dynamically chosen based on the requirements of a particular application. More specifically, the present invention recognizes that the minimum sampling rate for obtaining reliable input data may vary significantly among different applications. For example, while a high sampling rate may be necessary for accurately representing the intricacies of a user's handwriting or signature, a much lower sampling rate may be sufficient for purposes of determining that a button has been pushed or a menu item selected on the screen. Preferably, therefore, the sampling rate should be varied for different applications with different requirements. Furthermore, for any given application, the sampling rate could be varied over time depending on the function being executed at any particular moment. For example, for a word processing application, a certain sampling rate could be used at the opening screen (when the user is setting up or opening files), a higher rate could be used once a file is opened for graphical or like input, and a lower rate could later be used during formatting, spell checking or printer setup.

In one aspect, the present invention provides a system for executing a plurality of software applications, each application capable of performing at least one flnction. The system comprises a display screen adapted for receiving a touch input from a user; means for sampling the touch screen input at any one of a plurality of sampling rates; means for storing a predetermined sampling rate for each application or for each function; and means for setting the sampling rate of the sampling means to the sampling rate stored for a given application or a given function whenever that given application is being executed or that given function is being performed, respectively. In this aspect, the sampling means may comprise an analog-to-digital (A/D) converter and a microcontroller that is connected to the A/D converter. The setting means may comprise a microprocessor that communicates with the microcontroller.

A portable computer constructed according to this first aspect of the present invention may operate in first and second modes. In the first mode, the sampling rate of the sampling means is differently set for different applications or functions while, in the second mode, the sampling rate of the sampling means is similarly set for all applications or functions. The first mode may be activated when the portable computer is switched from using AC power to using battery power. The first mode also may be activated by a user command when the portable computer is using AC power.

In another aspect, the present invention provides a system comprising a display screen adapted for receiving a touch input from a user; means for sampling the touch screen input and for generating a plurality of sample points representative of the touch screen input; means for determining the rate of change of the sample points; and means for adjusting the sampling rate of the sampling means based on the rate of change of the sample points. According to this aspect, the sampling rate may be increased or decreased when the rate of change of the sample points increases or decreases, respectively. In one embodiment, the rate of change of the sample points is determined using the formula $$\frac{\sqrt{x^2 + y^2}}{\Delta t},$$

where x and y are the distances between two successive sample points along a horizontal and a vertical axis, respectively, of the display screen, and $\Delta t$ is the time interval between the two sample points.

A portable computer constructed according to this second aspect of the present invention may operate in first and second modes. In the first mode, the sampling rate of the sampling means is adjusted based on the rate of change of the sample points while, in the second mode, the sampling rate of the sampling means is fixed regardless of any changes in the sample points. The first mode may be activated when the portable computer is switched from using AC power to using battery power. The first mode also may be activated by a user command when the portable computer is using AC power.

These and other aspects, objects and advantages of the present invention will become readily apparent from the accompanying drawings and the detailed description of the invention as set forth below.

BRIEF DESCRIPTION OF THE DRAWINGS

The present invention will be better understood and its numerous objects and advantages will become apparent to those skilled in the art by reference to the following drawings in which.

DETAILED DESCRIPTION

Figure 1:
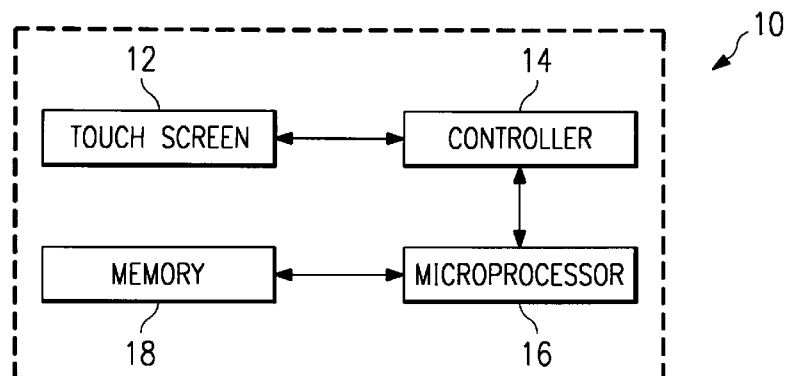
FIG. 1 is a block diagram of a portable computer including a touch screen and a controller for sampling user input to the touch screen in accordance with the present invention.

Referring first to FIG. 1, a portable computer 10 constructed in accordance with the present invention includes a touch screen 12 which is connected to a controller 14. The controller 14, in turn, communicates with a microprocessor 16 which is connected to a memory 18. In the preferred embodiment, the controller 14 comprises an application specific integrated circuit (ASIC) which is commercially available as part No. MK712 from MicroClock Corporation. Such an ASIC includes a 12-bit analog-to-digital (A/D) converter that can be used for sampling the user input to the touch screen 12, the sampling rate being set by an appropriate message from the microprocessor 16 to the controller 14. In other embodiments, however, the controller 14 may comprise a general purpose microcontroller such as part No. M37735MHL sold by Mitsubishi Corporation or, alternatively, an H8 series microcontroller that is sold by Hitachi Corporation, each of which microcontrollers also includes an A/D converter. However, the controller 14 may be implemented using other types of available microcontrollers which do not have a built-in A/D converter. In that case, an external A/D converter can be added between the controller 14 and the touch screen 12 in FIG. 1.

With continuing reference to FIG. 1, the memory 18 comprises one or more electronic storage media such as a random access memory (RAM), a read only memory (ROM) and/or a magnetic disc or CD ROM drive. In the preferred embodiment, the memory 18 stores the operating system (OS) software for the portable computer 10, the driver software for the controller 14 and various software applications such as word processing, desktop publishing, handwriting recognition or graphics applications. Each of these applications can be used one at a time or simultaneously as "background" and "foreground" applications, as well known in the art. The microprocessor 16 acting under the control of the OS coordinates the execution of these applications and the performance of any related or other tasks. The microprocessor 16 also communicates with the controller 14 in accordance with the instructions in the controller driver software which is resident in the memory 18.

Figure 2:
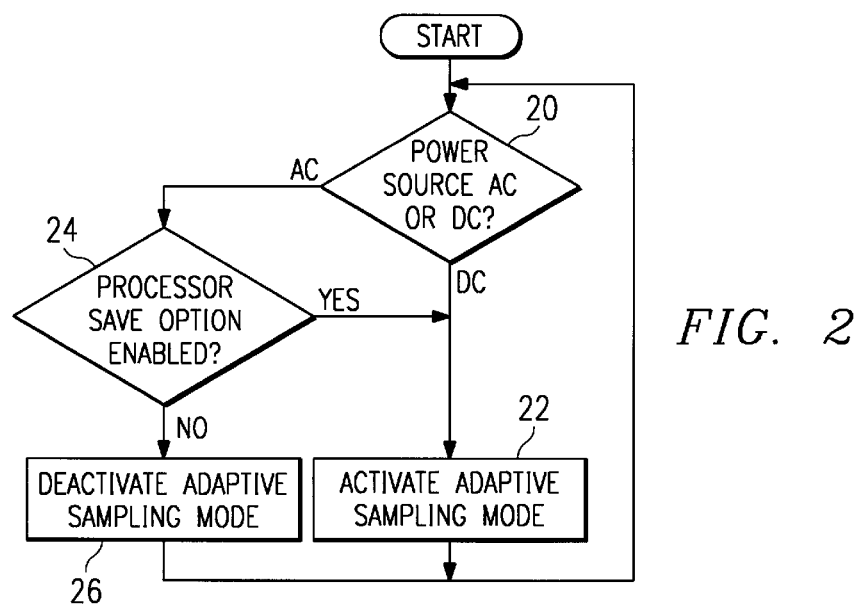
FIG. 2 is a flow chart illustrating the conditions for activating the adaptive sampling mode of the present invention.

Whereas the prior art used a constant sampling rate for touch screen input the present invention provides an adaptive sampling mode which allows the sampling rate to be chosen so as to minimize power consumption and/or microprocessor load. Referring next to FIG. 2, the adaptive sampling mode of the present invention may be activated whenever the portable computer 10 is switched from using AC power to using battery power or whenever the user selects a "processor save" setting while the portable computer 10 is operating on AC power. During normal use, the microprocessor 16 determines at block 20 whether the portable computer 10 is operating on AC or battery power. If, for example, the portable computer 10 is disconnected from a standard AC adapter and connected to a conventional battery pack, the microprocessor 16 proceeds to block 22 and activates the adaptive sampling mode. In this instance, the adaptive sampling mode can be used to adjust (e.g., reduce) the sampling rate of the controller 14 in order to conserve battery power. However, the adaptive sampling mode of the present invention can optionally be used during AC operation (when power conservation is not a significant concern) in order to save processing load. Specifically, if at block 20 the microprocessor 16 determines that the portable computer 10 is being powered from an AC source, it proceeds to block 24 and tests whether the user has selected the processor save option (e.g., in the user's "personal preferences" menu). If this option has been selected, the adaptive sampling mode will be activated so as to maximize the efficiency or improve the performance of the microprocessor 16. On the other hand, if this option has not been selected by the user during AC operation, the adaptive sampling mode may be turned off as shown in FIG. 2.

Figure 3:
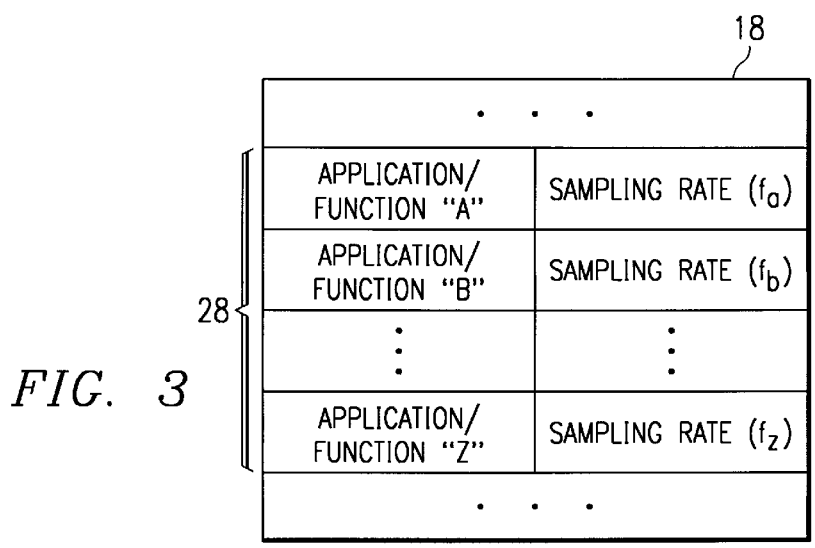
FIG. 3 is a block diagram of a portion of a memory included in the portable computer of FIG. 1 in accordance with one embodiment of the present invention.

When the adaptive sampling mode is activated as shown in FIG. 2, the sampling rate used by the controller 14 is dynamically set based on the type of application or function (within a particular application) currently being executed by the portable computer 10. Referring to FIG. 3, in a preferred embodiment of the present invention the memory 18 stores a look-up table 28 containing a list of applications and/or functions and, for each application or function, a particular sampling rate to be used when that application or function is being executed. The specified sampling rate for any application or function is dependent on the type of application or function and represents the minimum sampling rate for reliably processing the type of touch screen input required by that application or function. Thus, for example, a relatively high sampling rate in the range of 190–200 points per second may be specified for applications or functions that process the user's handwriting or drawing on the touch screen 12. Conversely, a relatively low sampling rate in the range of 40–50 points per second may be specified for applications or functions that allow the user to navigate menus or issue commands by pushing buttons that are displayed on the touch screen 12. The specified sampling rates for other types of applications or functions may fall somewhere between the foregoing exemplary high and low sampling rates. It is deemed to be well within the ordinary skill of practitioners in the art to select a minimum sampling rate for each application or function of interest that is stored in the look-up table 28.

Figure 4:
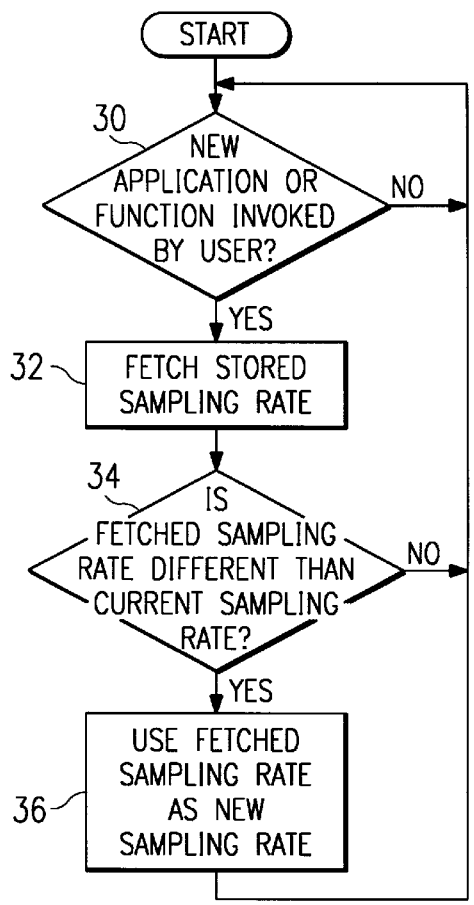
FIG. 4 is a flow chart illustrating operation of the portable computer of FIG. 3.

FIG. 4 shows the steps executed by the microprocessor 16 when the look-up table 28 is used in the adaptive sampling mode of the present invention. At block 30 the microprocessor 16 determines whether the user has invoked a new application or function (e.g., where the user has selected a handwriting application or a graphics editor in a word processing application, or where a background application is returned to the foreground). If the user has invoked a new application or function, the microprocessor 16 proceeds to block 32 and retrieves from the look-up table 28 the sampling rate specified for that new application or function. At block 34 the microprocessor 16 compares the specified sampling rate with the sampling rate currently being used by the controller 14. If the current sampling rate is different than the specified sampling rate, the microprocessor 16 at block 36 sends an order to the controller 14 to begin using the specified sampling rate.

Figure 5:
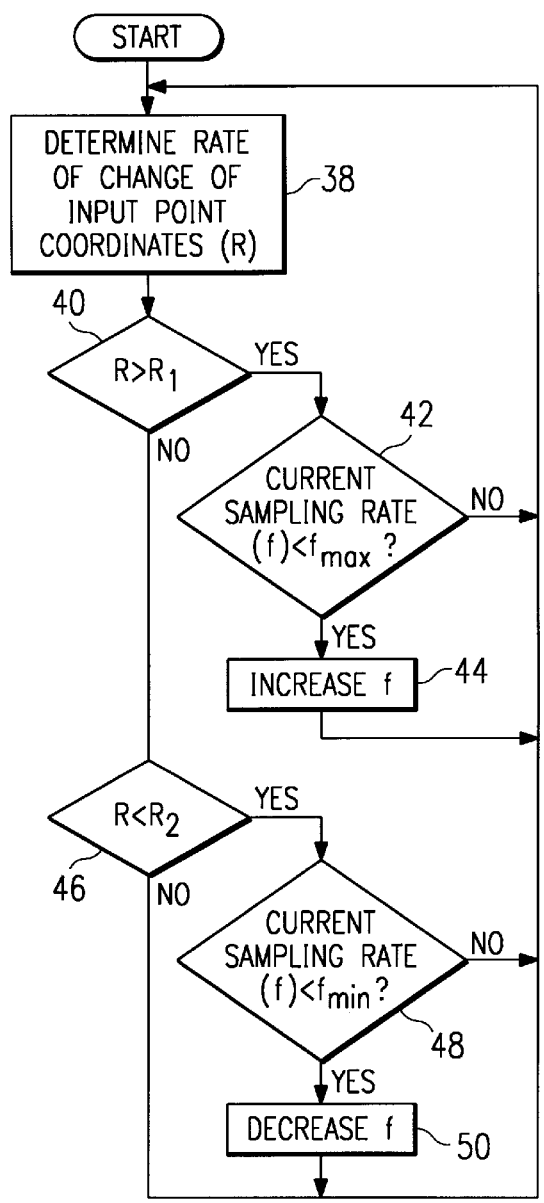
FIG. 5 is a flow chart illustrating the operation of another embodiment of the present invention.

FIG. 5 shows an alternative embodiment of the present invention in which the sampling rate is adjusted based on the rate of change of the touch screen input received from the user (rather than based on the application or function being performed, as was the case in FIGS. 3–4). According to this alternative embodiment as shown in FIG. 5, the microprocessor 16 at block 38 determines the rate of change (R) in the coordinates of the input points detected by the controller 14 on the touch screen 12. The value of R can be calculated according to the following formula:

$$R = \frac{\sqrt{x^2 + y^2}}{\Delta t}$$

where "x" and "y" are the distances in inches between two successive input points (samples) along the horizontal and vertical axes, respectively, of the touch screen 12; and "$\Delta t$" is the time in seconds between two successive samples (i.e., $\Delta t$ is the current sampling period, which is the inverse of the current sampling rate). At block 40 the calculated value for R is compared with a predetermined threshold value $R_1$ which, for example, may be chosen to be 1.0 inch per second. A determination that R is greater than $R_1$ indicates that the input points are rapidly changing position (e.g., the user is drawing on the touch screen 12). At block 42 the microprocessor 16 determines whether the current sampling rate used by the controller 14 is less than the maximum allowable rate (which could be the maximum possible rate provided by the controller 14 or, alternatively, a user-defined maximum rate). Assuming that the current sampling rate does not exceed the maximum allowable rate, the microprocessor 16 proceeds to block 44 and increases the sampling rate to compensate for the higher touch screen input rate. At block 44 the sampling rate could be increased by a predetermined amount (or steps) such as 50 points per second or, alternatively, the sampling rate could be increased to a predetermined level such as 200 points per second.

Returning to block 40 of FIG. 5, if the value of R was not greater than the value of $R_1$ a second determination is made as to whether the value of R is less than a second threshold value $R_2$ which, for example, may be chosen to be 0.5 inches per second. A determination that R is less than $R_2$ indicates that the input points are not changing position or only slowly changing position (e.g., the user is pushing a single button on the touch screen 12). In that event the microprocessor 16 moves to block 48 to test whether the current sampling rate is greater than the minimum allowable rate (which again could be the minimum possible rate provided by the controller 14 or, alternatively, a user-defined minimum rate). Assuming that the current sampling rate is above the minimum allowable rate, the microprocessor 16 proceeds to block 50 and decreases the sampling rate in view of the lower touch screen input rate. At block 50 the current sampling rate could be decreased by a predetermined amount (or steps) such as 50 points per second or, alternatively, the sampling rate could be decreased to a predetermined level such as 50 points per second.

From the foregoing description it will be appreciated that the present invention allows for flexible assignment of the touch screen input sampling rate based on the requirements of a particular application. Furthermore, it will be appreciated that where appropriate the present invention will automatically reduce the sampling rate and save power and/or improve processor performance without sacrificing the reliability of the input to the touch screen controller.

While certain forms or embodiments of the present invention have been illustrated above, those skilled in the art will readily recognize that many modifications and variations may be made to the forms and embodiments of the present invention disclosed herein without substantially departing from the spirit and scope of the present invention. Thus, for example, although the present invention has been illustrated above in the context of a portable computer, it will be readily appreciated that the teachings of the present invention are applicable to any machine, equipment or device which is capable of receiving and processing touch screen input.

Accordingly, the form of the invention disclosed herein is exemplary and is not intended as a limitation on the scope of the invention as defined in the following claims.

We claim:

1. A system for executing a plurality of software applications, each application capable of performing at least one function, the system comprising:
   a display screen adapted for receiving a touch input from a user;
   means for sampling said touch screen input at any one of a plurality of sampling rates;
   means for storing a predetermined sampling rate for each said application or for each said function; and
   means for setting the sampling rate of said sampling means to the sampling rate stored for a given application or a given function whenever that given application is being executed or that given function is being performed, respectively.

2. The system of claim 1 wherein said sampling means comprises an analog-to-digital (A/D) converter.

3. The system of claim 2 wherein said sampling means further comprises a microcontroller that is connected to said A/D converter.

4. The system of claim 3 wherein said setting means comprises a microprocessor that communicates with said microcontroller.

5. The system of claim 1 wherein said software applications and said sampling rates are stored in a memory of said system.

6. The system of claim 1 wherein said system comprises a portable computer.

7. The system of claim 6 wherein said portable computer operates in first and second modes, the sampling rate of said sampling means being differently set for different applications or functions while said portable computer is operating in said first mode, and the sampling rate of said sampling means being similarly set for all applications or functions while said portable computer is operating in said second mode.

8. The system of claim 7 wherein said first mode is activated when said portable computer is switched from using AC power to using battery power.

9. The system of claim 8 wherein said first mode is also activated by a user command when said portable computer is using AC power.

10. A touch screen input sampling system comprising:
    a display screen adapted for receiving a touch input from a user;
    means for sampling said touch screen input and for generating a plurality of sample points representative of said touch screen input;
    means for determining the rate of change of said sample points; and
    means for adjusting the sampling rate of said sampling means based on the rate of change of said sample points.

11. The system of claim 10 wherein said sampling means comprises an analog-to-digital (A/D) converter.

12. The system of claim 11 wherein said sampling means further comprises a microcontroller that is connected to said A/D converter.

13. The system of claim 12 wherein said determining means and said adjusting means are implemented in a microprocessor that communicates with said microcontroller.

14. The system of claim 10 wherein said sampling rate is increased or decreased when the rate of change of said sample points increases or decreases, respectively.

15. The system of claim 14 wherein the rate of change of said sample points is determined using the formula $$\frac{\sqrt{x^2 + y^2}}{\Delta t},$$

where x and y are the distances between two successive sample points along a horizontal and a vertical axis, respectively, of said display screen, and $\Delta t$ is the time interval between said two sample points.

16. The system of claim 10 wherein said system resides in a portable computer.

17. The system of claim 16 wherein said portable computer operates in first and second modes, the sampling rate of said sampling means being adjusted while said portable computer is operating in said first mode, and the sampling rate of said sampling means being fixed while said portable computer is operating in said second mode.

18. The system of claim 17 wherein said first mode is activated when said portable computer is switched from using AC power to using battery power.

19. The system of claim 18 wherein said first mode is also activated by a user command when said portable computer is using AC power.

20. In a system having a display screen for receiving a touch input from a user, the system capable of executing a plurality of software applications, each application capable of performing at least one function, each of said applications or functions being invoked in response to a user command, a method for controlling the sampling of said touch screen input comprising the steps of:
    storing in a memory of said system a predetermined touch screen input sampling rate for each said application or for each said function;
    monitoring said system to determine whether a given application or a given function has been invoked;
    whenever a given application or a given function is invoked, retrieving from said memory the touch screen input sampling rate for said given application or said given function; and
    while said given application is being executed or said given function is being performed, sampling said touch input to said display screen at said retrieved touch screen input sampling rate.

21. The method of claim 20 wherein said system comprises a portable computer that operates in first and second modes that are alternately activated, said touch input to said display screen being sampled at the touch screen input sampling rate stored for the application being executed or the function being performed while said first mode is activated, and said touch input to said display screen being sampled at a constant rate while said second mode is activated.

22. The method of claim 21 wherein said first mode is activated when said portable computer is switched from using AC power to using battery power.

23. The method of claim 22 wherein said first mode is also activated by a user command when said portable computer is using AC power.

24. A method for controlling the sampling of a touch input from a user to a display screen, the method comprising the steps of:
    generating a plurality of sample points representative of said touch screen input;
    determining the rate of change of said sample points; and adjusting the rate of sampling of said touch screen input based on the rate of change of said sample points.

25. The method of claim 24 wherein said sampling rate is increased or decreased when the rate of change of said sample points increases or decreases, respectively.

26. The method of claim 25 wherein the rate of change of said sample points is determined using the formula $$\frac{\sqrt{x^2 + y^2}}{\Delta t},$$

where x and y are the distances between two successive sample points along a horizontal and a vertical axis, respectively, of said display screen, and $\Delta t$ is the time interval between said two sample points.

27. The method of claim 24 wherein said display screen is part of a portable computer that operates in first and second modes, the rate of sampling of said touch screen input being adjusted while said portable computer is operating in said first mode, and the rate of sampling of said touch screen input being fixed while said portable computer is operating in said second mode.

28. The method of claim 27 wherein said first mode is activated when said portable computer is switched from using AC power to using battery power.

29. The method of claim 28 wherein said first mode is also activated by a user command when said portable computer is using AC power.

30. The method of claim 27 wherein said sampling rate is increased or decreased when the rate of change of said sample points increases or decreases, respectively.

* * * * *